July 13, 1948.　　　T. BAILEY　　　2,445,101
LIQUID DISPENSER HANDLE AND VALVE ACTUATOR
Filed Nov. 4, 1944　　　3 Sheets-Sheet 1

INVENTOR.
Theodore Bailey
BY Victor J. Evans & Co.
ATTORNEYS

INVENTOR.
Theodore Bailey

July 13, 1948. T. BAILEY 2,445,101
LIQUID DISPENSER HANDLE AND VALVE ACTUATOR
Filed Nov. 4, 1944 3 Sheets-Sheet 3
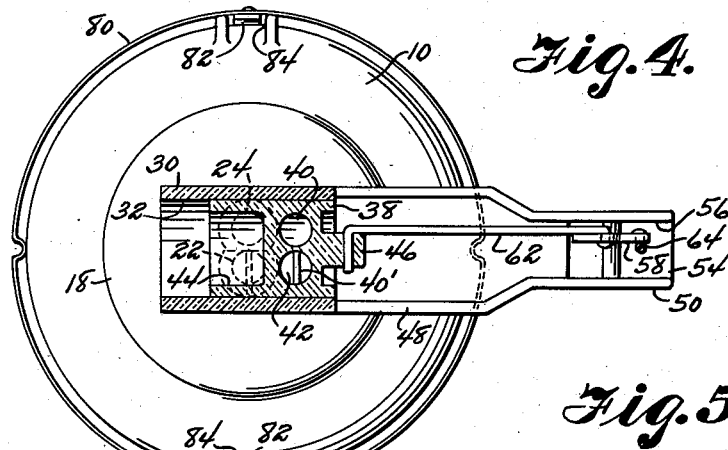
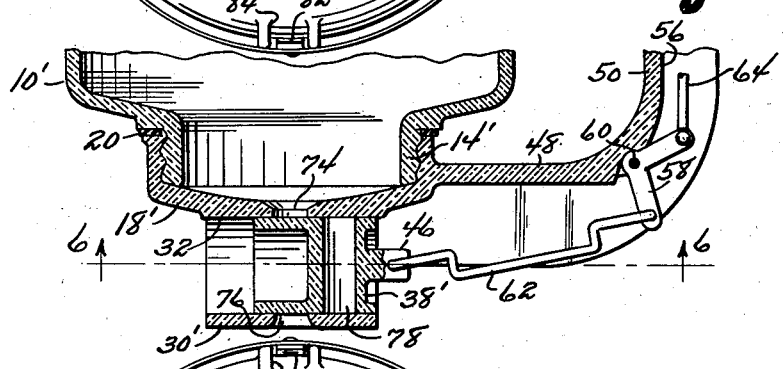
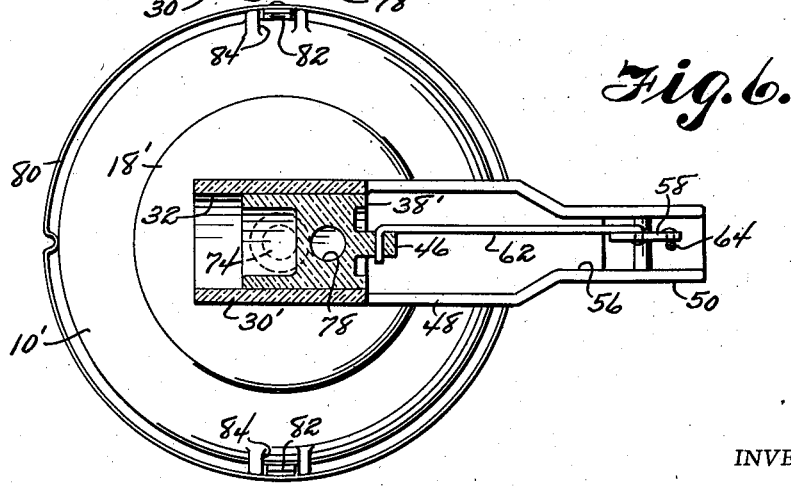
INVENTOR.
Theodore Bailey
BY
ATTORNEYS Patented July 13, 1948

2,445,101

UNITED STATES PATENT OFFICE 2,445,101

LIQUID DISPENSER HANDLE AND VALVE ACTUATOR

Theodore Bailey, Habana, Cuba

Application November 4, 1944, Serial No. 561,920

1 Claim. (Cl. 222—474)

This invention appertains to improvements in dispensing apparatus generally, and has for one of its several objects to provide a storage and dispensing container, especially designed for household use, for the storage of liquid or powdered materials and the dispensing of the same in measured quantities to facilitate the preparation of foodstuffs and to otherwise lighten the labors of the average housewife in the performance of her kitchen routine.

Another object of the invention has to do with the provision of a dispensing container of this kind, which is constructed and arranged in a manner to store liquid or powdered food materials in a sanitary condition and to be easily cleaned when required; the container being adapted to be supported in an inverted position after filling, and having its inverted end provided with a removable cover, upon which, the dispensing means is mounted to that end.

A further object of the invention lies in the provision of a dispensing container as hereinbefore characterized and which has the removable cover provided with valved outlet that is constructed in a manner to prevent any lateral discharge of the content of the container, or drippage, in the case of a liquid content, following discharge of measured quantities thereof.

With these and other objects and advantages in view, the invention resides in the certain new and useful combination, construction, and arrangement of parts, as will be hereinafter more fully described, set forth in the appended claim, and illustrated in the accompanying drawings, in which:

Figure 4 is a horizontal section, taken through the line 4—4 on Figure 2;

Figure 5 is a fragmentary sectional view, similar to that of Figure 2, but showing a slightly modified form of discharge outlet and control valve therefor; and Figure 6 is a horizontal section, taken through the line 6—6 on Figure 5.

Figure 1:
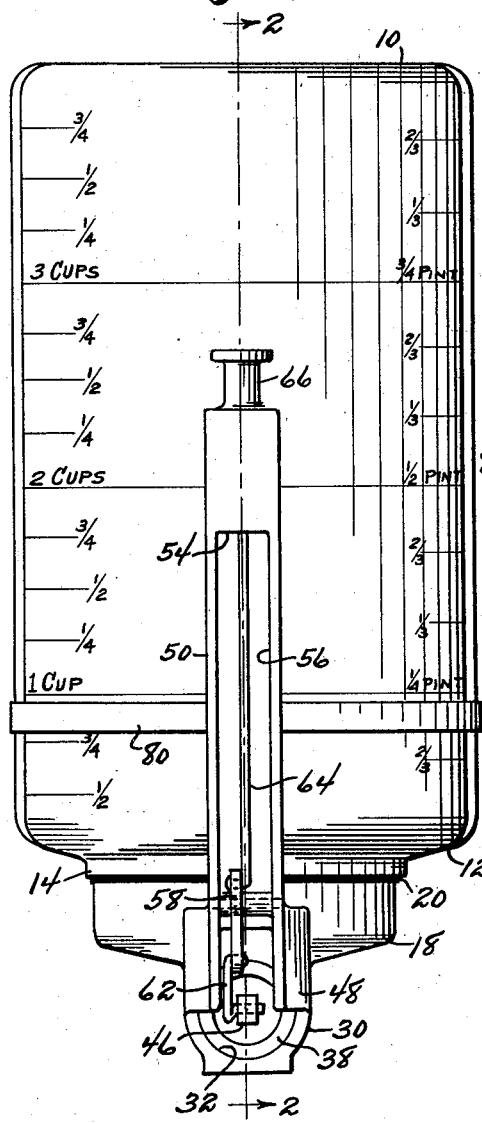
Figure 1 is a front side elevation of the dispensing container, in accordance with the invention.

Referring to the drawings, wherein like characters of reference denote corresponding parts in the several views, and more particularly, to Figures 1 through 4, the embodiment of the invention, as it is exemplified therein, is comprised in a container 10, preferably made to jar-like form and of a transparent material, such as glass or a plastic, and to a capacity suitable for the storage of an average supply of liquid or powdered materials, as are commonly employed in household baking and cooking operations. Also, the container 10 is preferably formed with an open neck portion 14 at one end and this is joined to the body portion by a sloping wall portion 12, to prevent lodgment of a contained material thereon and to otherwise facilitate the discharge of the material through the neck opening, when the container is inverted. The neck portion 14 is exteriorly screw-threaded, as at 16, to receive a removable closure or cover 18 thereon, and is provided with a gasket 20 to prevent leakage of a liquid content of the container from between the neck portion and the closure or cover.

The outer side of the end wall of the closure or cover 18 is provided with a housing 30, which is formed with an open ended bore 32, to receive a slide valve 38, that has a pair of parallel ports 40 and 42 opening through the same to be moved into and out of registry with pairs of aligned apertures or ports 22, 24, and 34, 36, formed respectively in the end wall of the closure or cover 18 and the outer or lower wall of the housing 30. As shown, the housing 30 is centered on the closure or cover 18 and it may be formed integrally therewith. Also, the housing 30 is elongated diametrically of the closure or cover 18 and to a length to permit of a proper movement of the slide valve 38, in the bore 32, to open and close communication between the ports 22, 24, and 34, 36; all of the latter being disposed substantially in line with the axis of the container 10. To ease the operative motions of the slide valve 38, its forward end is hollowed out, as at 44, and its rear end is provided with an apertured boss 46 for the connection thereto of an actuating means, as will be presently explained.

Extending laterally from the closure or cover 18, substantially in continuation with the housing bore 32, is the horizontal part 48 of an angled handle, the vertical part 50 of which is disposed in spaced relation to the side of the container 10 and parallel thereto, with its upper end terminating in an inwardly directed finger engaging abutment 52. A channel 56 is formed in the lower side of the horizontal handle portion 48, in line with the bore 32 of the housing 30, and continues upwardly in the outer side of the vertical handle portion 50 to a point short of the top end of the latter. Pivotally mounted within the channel 56, at the point of bend of the handle parts 48 and 50, and as at 60, is a bell-crank 58, which has one of its arms operatively connected by a rod 62 to the apertured boss 46, of the slide valve 38, and the other of its arms by a rod 64 to a thumb-piece 66, that is slidably mounted in a bore 68, formed in the shoulder 54 of the handle part 50, at the upper end of the channel in the latter. A counter-bore 70 is formed in the bottom of the main bore 68 to seat a compression spring 72, which is encircled about the rod 64 and cooperates with the thumb-piece 66 to retain the interconnected actuator parts at the normally closed position of the slide valve 38.

Figure 3:
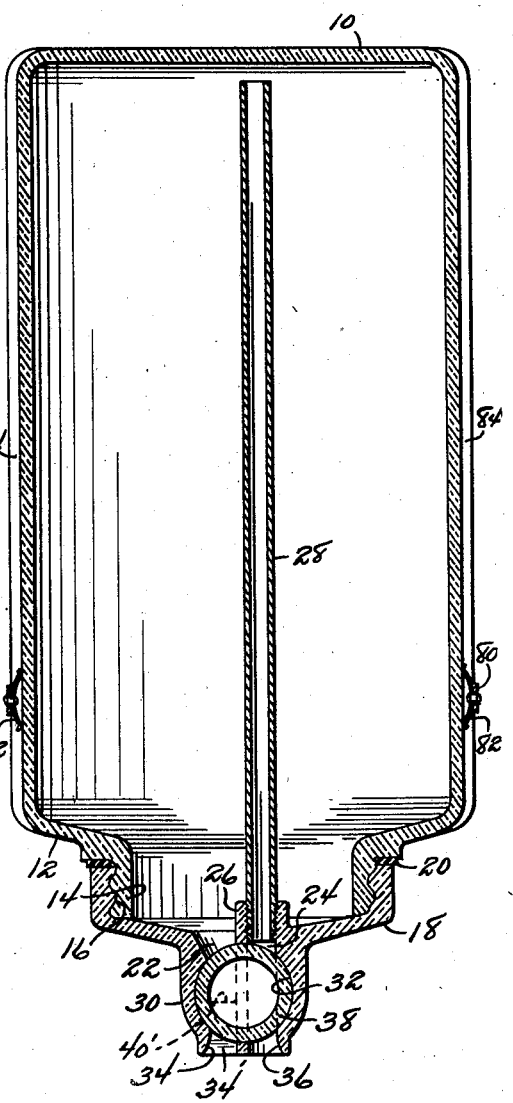
Figure 3 is a view similar to that of Figure 2, but taken through the line 3—3 on Figure 2.
Figure 2:
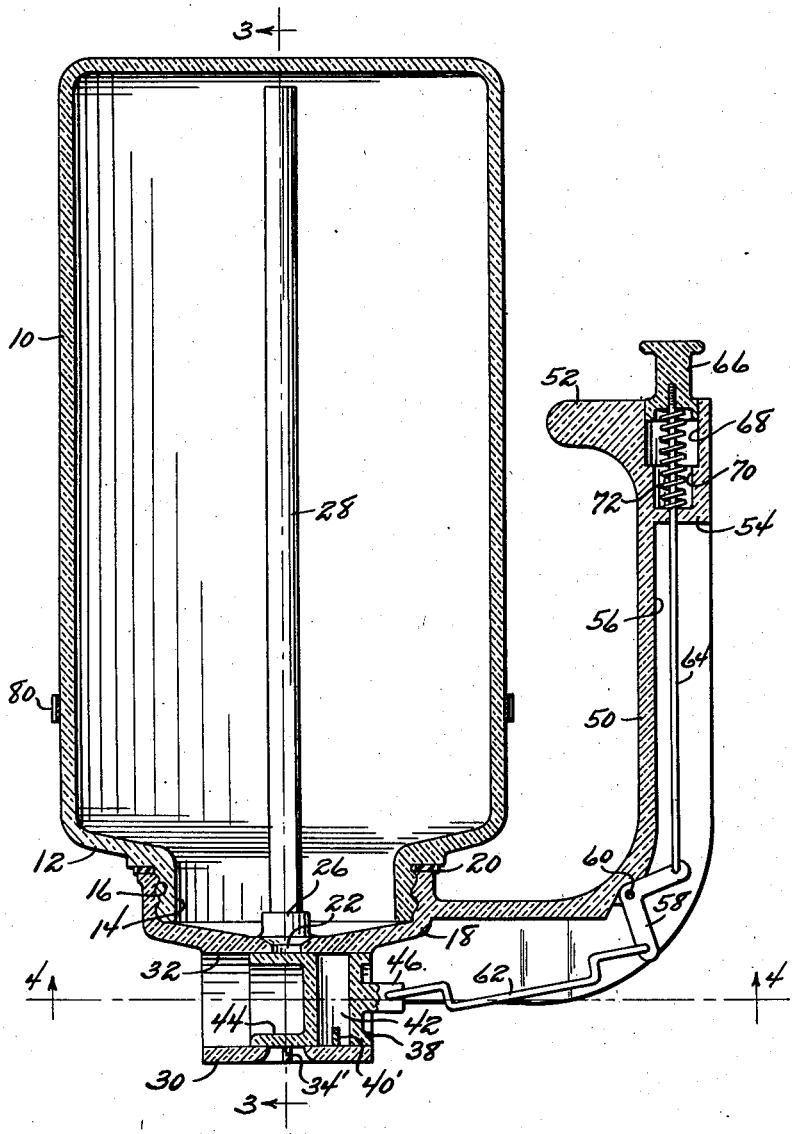
Figure 2 is a vertical section, taken through the line 2—2 on Figure 1.

In this form of the dispensing device, and in order to equalize the pressure within the container 10, the port 24, in the end wall of the closure or cover 18, is flanged, as at 26, to receive the lower end of a tubular vent 28, which extends vertically within the container and has its upper end terminated adjacent the top end wall of the latter, substantially as shown in Figures 2 and 3. Thus, when the slide valve 38 is moved to establish communication between the ports 22, 24, and 34, 36, air will pass upwardly through the port 36, in the housing 30; the port 42, in the slide valve 38; the port 24, in the closure or cover 18; and the vent tube 28, to the top of the container 10 and above the liquid content thereof. Contrawise, the contained liquid will flow from the container 10, downwardly through the port 22, in the closure or cover 18; the port 40, in the slide valve 38; and out through the port 34, in the housing 38. The movement of the slide valve 38 to its open position is to be quickly accomplished by the user grasping the vertical handle part 50 in one hand, with the abutment 52 resting on the index finger and thumb pressure exerted on the thumb-piece 66 in a downwardly direction and against the tension of the coiled spring 72, which, upon the release of the pressure of the thumb, returns the parts to normal position; the reverse motions of the thumb-piece 66 being transmitted to the slide valve 38, through the bell-crank 58 and the connecting rods 62 and 64. In order to prevent spattering and drippage of the liquid in its discharge from the outlet port 34, this port, as well as the port 36, are outwardly or downwardly flared and, additionally, the port 34 is halved by a cross-baffle 34', which acts in conjunction with a like baffle 40', provided in the lower end of the port 42 of the slide valve 38, to that end.

In the form of the dispensing device shown in Figures 5 and 6, which is particularly designed for dispensing powdered or granular materials, the closure or cover 18', the housing 30', and the slide valve 38', are each here provided with but a single, centrally located, port, the same being indicated at 74, 76, and 78, respectively, for the discharge of a material upon the movement of the slide valve 38' to place its port 78 in line with the ports 74 and 76. In effectively dispensing this class of material, the vent tube 28 and its associated air inlet ports 24, 26, and 42, of the liquid dispensing device, are eliminated, otherwise, the two described devices are identical, except as above noted.

In both forms of the dispensing devices, the containers 10 and 10' are each provided with two scales of measurement indicia, one graduated in units and fractions of units of the standard liquid measure table and the other in cupfuls and fractions of cupfuls, as commonly employed in private or home kitchens, the scales being preferably spaced apart, one to either side of the vertical handle part 50 and extending parallel thereto, substantially as shown in Figure 1. Cooperative with both of the scales is a single index means which is movable relatively thereto in a manner to visually indicate the amount the material to be discharged from a container, as previously determined by the setting of the index means at a graduation, on one or the other of the scales, bearing relation to the level of the material within the container that is indicative of the lower level thereof, when the selected amount of same has been discharged. This index means preferably takes the form of an annular band 80 engaged on a container and provided with arcuate spring members 82, at opposite points on its inner periphery, which have frictional sliding movements in guiding grooves 84, formed in the surface of the container. By this arrangement, guessing an amount of material to be dispensed is avoided, and resort to independent measuring devices is unnecessary.

In the use of these dispensing devices, it will be obvious that food materials, such as molasses, honey, milk, sugar, etc., may be kept in a sanitary condition and free from any contact with flies, ants, and like insects, which are exceedingly obnoxious and dangerous to health, particularly in the tropics. Also, that they provide a convenient means for accurately and quickly dispensing materials in more or less common use in the average household or other kitchen, where large quantities of such materials are not required. Again, the quick detachable features of assembly of the parts provides for convenience and ease in the separation of the same for cleaning purposes and, in this connection, it is to be noted that the rod 62 is merely hooked at one of its ends into the boss 46, of the valve members 38, 38' and the arm of the bell-crank 58, for its quick removal to free the valve members for their like removal from the housings 30, 30'. Thus, with the separation of the valve members from the housings and the closures or covers flom the containers, all parts of the devices are made freely accessible for cleaning.

Having thus fully described my invention, it is to be understood that any and all changes in design and minor details of constructure and arrangement of parts, to which the disclosed embodiments thereof are susceptible, may be resorted to without departing from the spirit of the invention, or its scope as claimed.

I claim:

In a dispenser having an inverted bottle-like storage container with a threaded neck, the combination, which comprises, a closure forming an inverted cap threaded on said neck having a cylindrical valve housing with vertically disposed openings therethrough depending from the under surface and an inverted channel-shaped arm extending horizontally from one side to a point spaced from the wall of the container and then upward to form a handle adapted to be gripped by hand to carry the dispenser, said channel-shaped arm being aligned with the valve housing, a piston-like slide valve longitudinally slidable in said valve housing having openings therethrough positioned to register with the vertically disposed openings through the valve housing, said closure cap having a threaded boss on the inner surface positioned to register with one of the openings therethrough, a vent tube threaded in said boss and extending upward in the said container, a bell-crank pivotally mounted in the said channel-shaped arm, a rod connecting one arm of the bell-crank to the slide valve, a vertically disposed rod with a button on the upper end connected to the other arm of the bell-crank and extending through the upper end of the handle, and a spring resiliently urging the said vertically disposed rod upward to close the valve.

THEODORE BAILEY.

REFERENCES CITED

The following references are of record in the file of this patent:

UNITED STATES PATENTS

| Number | Name | Date |
|---|---|---|
| 540,844 | Schlueter | June 11, 1895 |
| 1,078,175 | Splaine | Nov. 11, 1913 |
| 1,281,991 | Menendez | Oct. 15, 1918 |
| 1,553,113 | Rutt | Sept. 8, 1925 |
| 1,636,752 | Mitchell | July 26, 1927 |
| 1,648,163 | Childs | Nov. 8, 1927 |
| 1,808,029 | Frame | June 2, 1931 |
| 1,959,695 | Sweetland | May 22, 1934 |
| 2,121,516 | Woo | June 21, 1938 |